US007124881B2

(12) United States Patent
Fee

(10) Patent No.: US 7,124,881 B2
(45) Date of Patent: Oct. 24, 2006

(54) METHOD AND APPARATUS FOR ASSOCIATING DOCUMENTS WITH SHIPPING CONTAINERS

(75) Inventor: Robert A. Fee, Memphis, TN (US)

(73) Assignee: Federal Express Corporation, Memphis, TN (US)

( * ) Notice: Subject to any disclaimer, the term of this patent is extended or adjusted under 35 U.S.C. 154(b) by 166 days.

(21) Appl. No.: 10/808,307

(22) Filed: Mar. 25, 2004

(65) Prior Publication Data

US 2004/0193511 A1 Sep. 30, 2004

Related U.S. Application Data

(60) Provisional application No. 60/457,566, filed on Mar. 27, 2003.

(51) Int. Cl.
B65D 71/00 (2006.01)
B65D 27/00 (2006.01)
B42D 15/00 (2006.01)

(52) U.S. Cl. ............ 206/232; 40/312; 206/459.5; 229/74; 283/81

(58) Field of Classification Search ........... 206/459.5, 206/232; 40/312–313, 638; 229/71, 74; 283/81
See application file for complete search history.

(56) References Cited

U.S. PATENT DOCUMENTS 1,185,832 A 6/1916 Saeger
1,558,305 A * 10/1925 Snape ..................... 229/74
2,214,011 A 6/1940 Broudy
2,362,181 A 11/1944 Zimmerman
3,155,234 A * 11/1964 Knoll et al. ............. 206/232
3,159,930 A * 12/1964 Allen et al. .............. 229/74
3,250,385 A * 5/1966 Timms ................... 229/74
3,327,416 A * 6/1967 Sanford .................. 229/74
3,330,470 A 7/1967 Timms
4,103,821 A * 8/1978 Gartshore et al. .......... 283/81
6,290,126 B1 * 9/2001 Zudal ..................... 40/312
6,601,755 B1 8/2003 Gillespie

* cited by examiner

Primary Examiner—Bryon Gehman
(74) Attorney, Agent, or Firm—Finnegan, Henderson, Farabow, Garrett & Dunner L.L.P.

(57) ABSTRACT

A system for associating documents with articles in a shipping container. The system includes an envelope having a generally flat body portion with an open end, first and second overlying flap portions extending from the open end and having oppositely facing exterior surfaces. The system also includes a shipping container having a main body and at least one cover portion that cooperates with the main body to enclose the articles. The envelope is receivable between the at least one cover portion and the main body of the shipping container and at least one of the first and second flap portions is affixable to an exterior surface of the container.

27 Claims, 6 Drawing Sheets

METHOD AND APPARATUS FOR ASSOCIATING DOCUMENTS WITH SHIPPING CONTAINERS

This application claims the benefit of the filing date of U.S. Provisional Application No. 60/457,566, filed Mar. 27, 2003, incorporated herein by reference.

FIELD OF THE INVENTION

The invention relates generally to methods and apparatus for associating documents with shipping containers.

BACKGROUND OF THE INVENTION

Every day various articles are shipped domestically and internationally in sealed containers, such as, for example, containers, boxes, and envelopes. Along with the articles, it is sometimes necessary to include various documents to provide evidence of the contents of the sealed containers or to provide additional information. These documents may include bills, invoices, and documentation required by Customs, among others.

Typically, these documents are either affixed to the outside of the sealed container or placed inside the container along with the articles to be shipped. Each arrangement has its own drawbacks. For example, when the documents are affixed to the outside of the sealed container, there is an increased risk that the documents will be lost during the shipping process. This may occur because the containers come in contact with other containers or objects, thereby stripping the documents from the container. In these instances, the person or other entity shipping the container may be required to provide copies of the documents to either the receiver or Customs before the sealed container is accepted/delivered. If the documents are placed inside the sealed container, the container must be opened to determine its contents or else the shipper will have to provide additional copies of the documents.

SUMMARY OF THE INVENTION

It is accordingly an aspect of the invention to provide an envelope that allows access to documents while reducing the risk of loss to them and without requiring the sealed container to be opened.

The present invention is directed to a system for associating documents with articles in a shipping container. The system includes an envelope having a generally flat body portion with an open end, first and second overlying flap portions extending from the open end and having oppositely facing exterior surfaces. The system also includes a shipping container having a main body and at least one cover portion that cooperates with the main body to enclose the articles. The envelope is receivable between the at least one cover portion and the main body of the shipping container and at least one of the first and second flap portions is affixable to an exterior surface of the container.

In another aspect, the present invention is also directed a method for associating documents with a shipping container having a main body with an exterior surface and at least one cover portion that cooperates with the main body to enclose a shipped article. The method includes placing an envelope beneath the at least one cover portion with an open end of the envelope accessible at a side of the cover portion and affixing a flap portion of the envelope to one of the exterior surface of the main body and the cover portion of the shipping container to secure the envelope against removal from the container.

In yet another aspect, the present invention is also directed to an envelope for associating documents with articles in a shipping container having a main body portion with an exterior surface and at least one cover portion. The envelope may include a body portion having an open end to receive documents and at least one flap portion formed at the open end. The body portion has an exterior surface and the at least one flap portion may have an exterior surface continuous with the exterior surface of the body portion. The envelope may also include an adhesive layer formed on the exterior surface of the at least one flap portion for affixing the at least one flap portion to an exterior surface of the container when the body portion of the envelope is located beneath the at least one cover portion.

In yet another aspect, the present invention is directed to a package. The package may include a container having an exterior surface and a cover portion. The cover portion may be configured to at least partially close an opening in the container. The package may also include an envelope having a body portion and a flap portion. The body portion may be configured to receive an article through an open end, and may be substantially contained within the container. The flap portion may extend from the body portion and may be attached to the exterior surface of the container.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed. In addition, it is intended that any occurrence of the singular form of document and article can encompass the plural form of documents and articles. It is also intended that any plural form of documents and articles can encompass the singular form of document and article.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE EMBODIMENTS

Reference will now be made in detail to the present exemplary embodiment of the invention, an example of which is illustrated in the accompanying drawings. Wherever possible, the same reference numbers will be used throughout the drawings to refer to the same or like parts.

Figure 2:
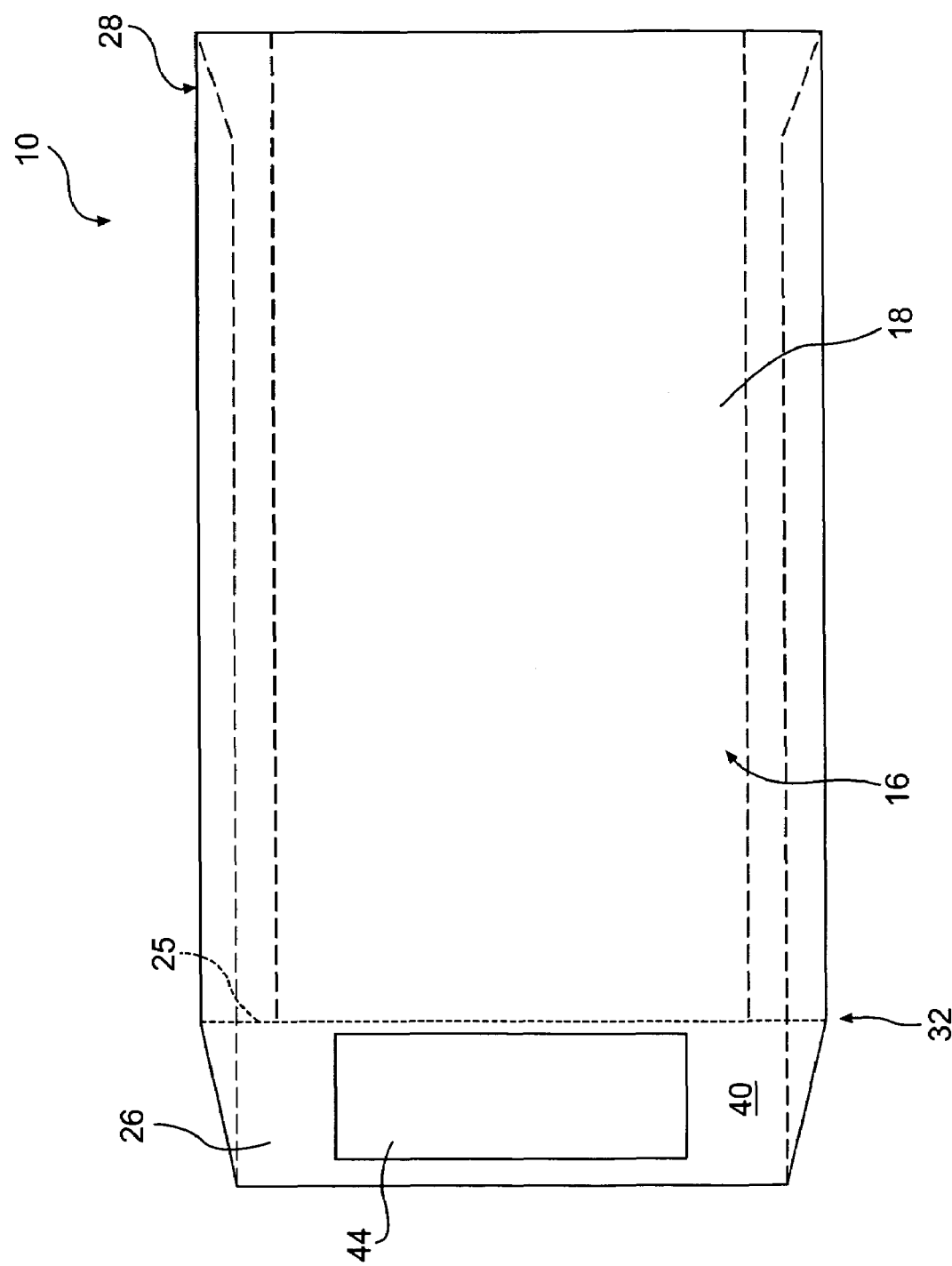
FIG. 2 is a plan view of the opposite side of the envelope of FIG. 1.
Figure 3:
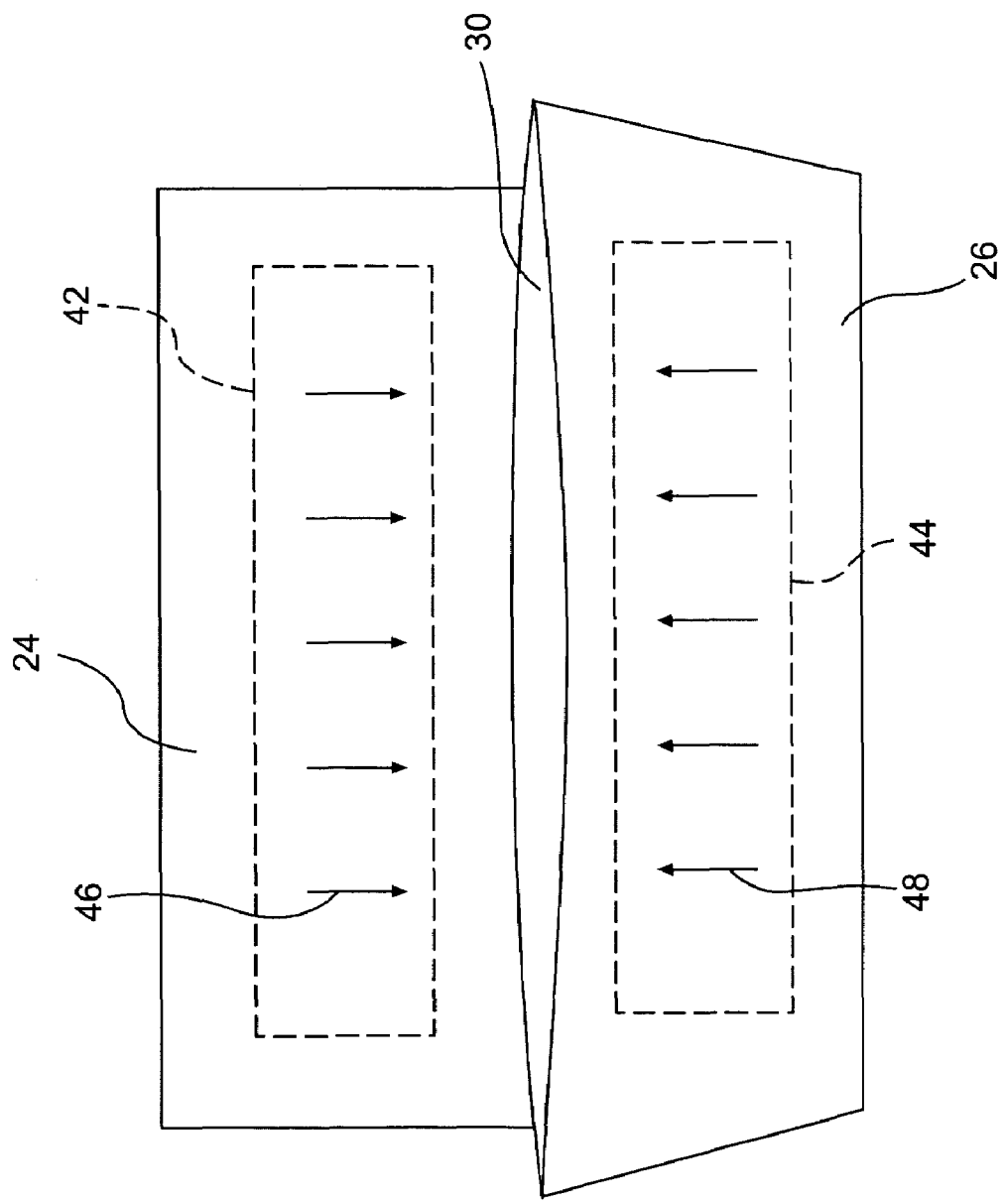
FIG. 3 is a front view of the envelope of FIG. 1.
Figure 4:
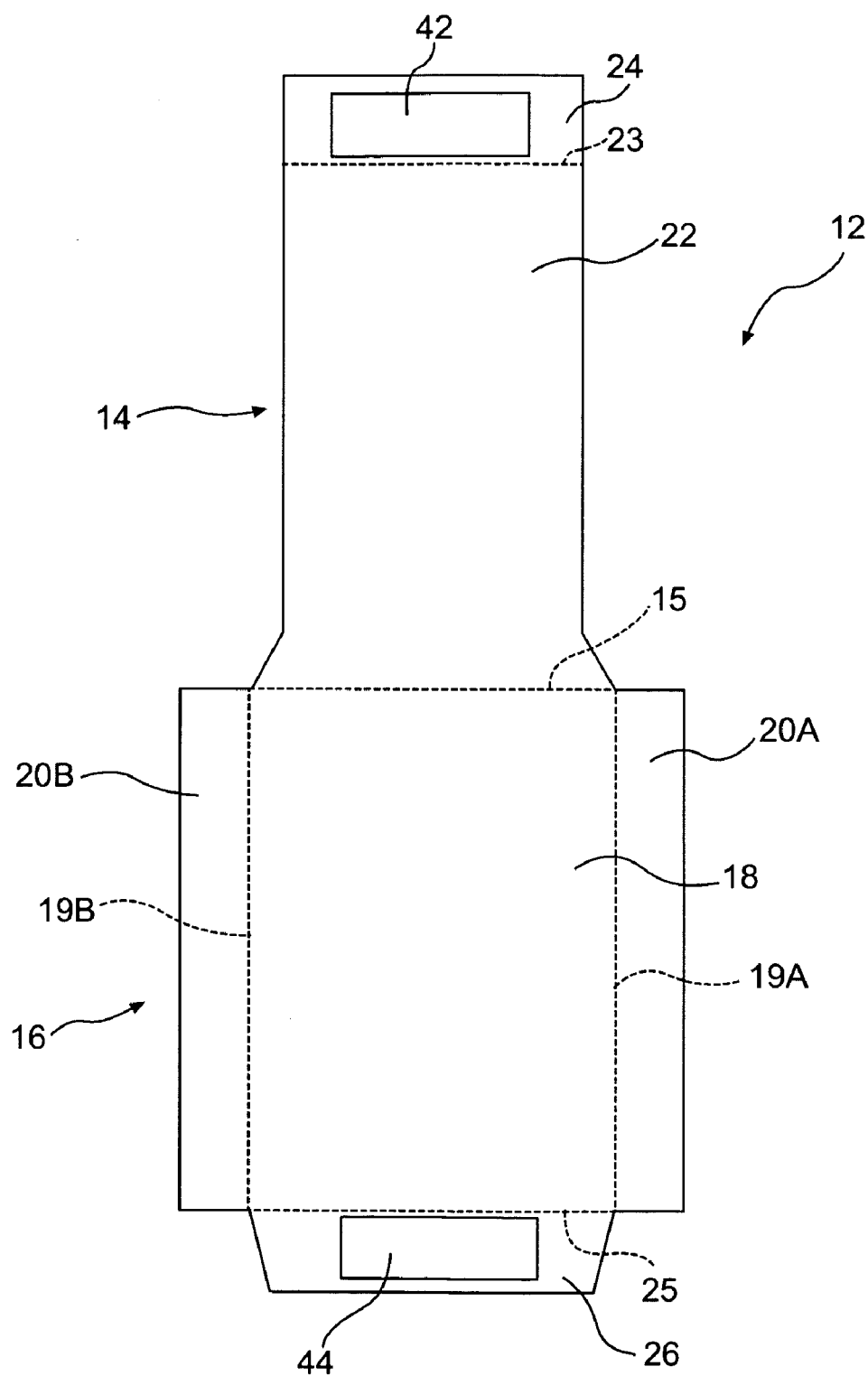
FIG. 4 is a plan view of a sheet from which the envelope of FIG. 1 is formed.

One exemplary embodiment of an envelope 10 is shown in FIGS. 1–4. As shown in FIG. 4, the envelope 10 is formed from a sheet 12 that includes a front panel 14 and a rear panel 16 separated from the front panel 14 by a fold line 15. The rear panel 16 includes a main portion 18 and side portions 20A, 20B separated from the main portion 18 by fold lines 19A, 19B, respectively. The front panel 14 includes a main portion 22 and a first flap portion 24 separated from the main portion 22 by a fold line 23. The rear panel 16 includes a second flap portion 26 separate from the main portion 18 by a fold line 25. The fold lines may be represented by such conventional means as perforations, creases, or simply by folds in the completed envelope.

Figure 1:
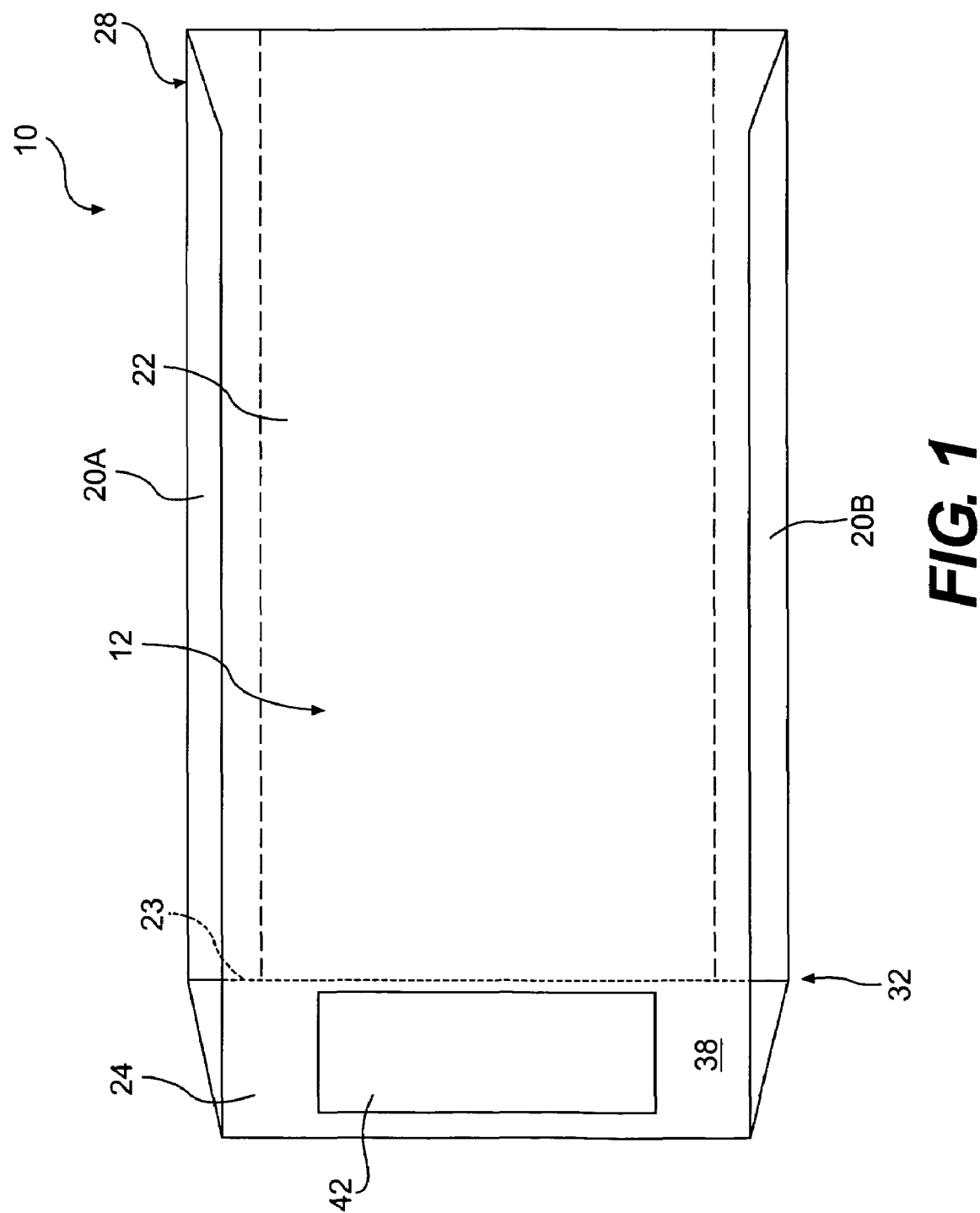
FIG. 1 is a plan view of an exemplary embodiment of an envelope of the present invention.

As shown in FIGS. 1 and 2, where the sheet 12 is folded into the shape of the envelope 10, the main portion 22 of the front panel 14 is sealed by an adhesive, for example, to the folded side portions 20A, 20B of the rear panel 16. The main portions 18, 22, and side portions 20A, 20B, form a body portion 28 of the envelop 10 defining an interior 30 and having three closed edges. The closed edges are formed at the fold lines 15, 19A, 19B. The fourth side of the envelope 10 is an open end 32 (shown in FIG. 3), which allows access to the envelope interior 30. The open end 32 is partially defined by the flap portions 24, 26 where they are joined at the main portions 18, 22 of the front and rear panels 14, 16. The open end 32 allows insertion of documents into the interior 30 of the envelope 10.

Each flap portion 24, 26 has an interior surface 34, 36, respectively, and an exterior surface 38, 40, respectively. The interior and exterior surfaces 34, 36, 38, 40 of the flap portions 24, 26 are continuous with the interior and exterior surfaces of the body portion 28 when the envelope 10 is formed. As shown in FIGS. 1–3, the flap portions 24, 26 may have different sizes and shapes to allow for quick identification and ease of separation of the flap portions during use.

Each of the flap portions 24, 26 includes an adhesive layer 42, 44, respectively, on respective exterior surfaces 38, 40. The adhesive layer 42, 44 may be applied to the exterior surfaces 38, 40 using any known process. For example, the adhesive layer may be formed of any suitable glue or tape. As shown in FIGS. 1 and 2, the adhesive layers 42, 44 do not cover the entire exterior surfaces of the flap portions 24, 26, but it is understood that different sizes, shapes, or locations of the adhesive layers 42, 44 on the exterior surfaces 38, 40 of the flap portions 24, 26 may be used. The adhesive layers 42, 44 may be protected, if necessary, using any suitable means for the type of adhesive used. For example, a removable piece of document may be placed over each of the adhesive layers prior to use.

Indicator marks 46, 48 may be provided on respective interior surfaces 34, 36 of flap portions 24, 26. These indicator marks may be any shape, color, or contrast; and they may serve different purposes. For example, as shown in FIG. 3, the indicator marks 46, 48 may be arrows that point to the open end 32 of the body portion 28 of the envelope 10. This should make it possible for receivers or Customs personnel to quickly locate the open end 32 and retrieve the contents from the envelope 10. The indicator marks may also be used to provide different information, such as, for example, logos, trademarks, or warnings.

Figure 5A:
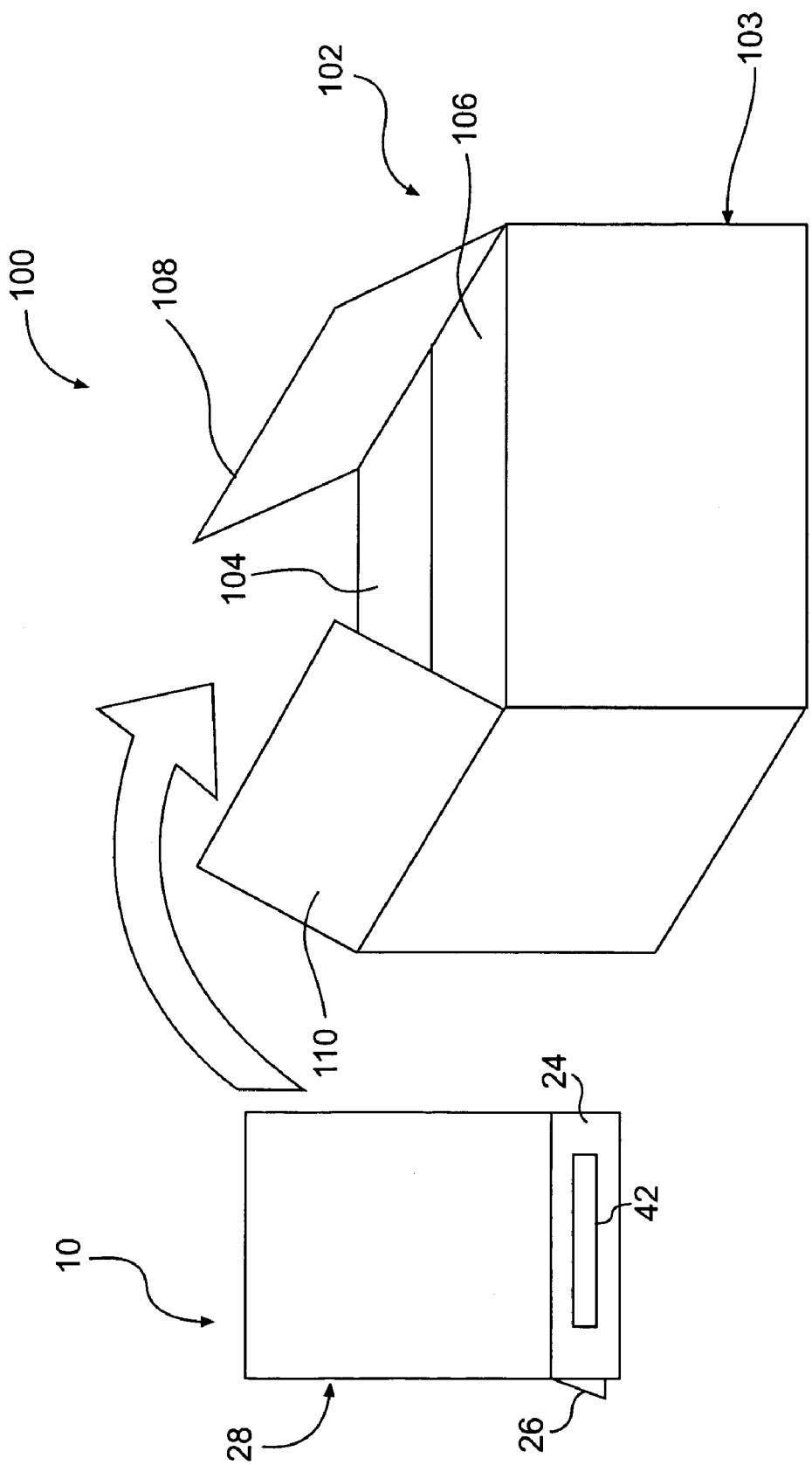
FIGS. 5A, 5B, and 5C, are isometric schematic views of an exemplary embodiment of a system including the envelope of FIG. 1 and showing the method of using the envelope.
Figure 5B:
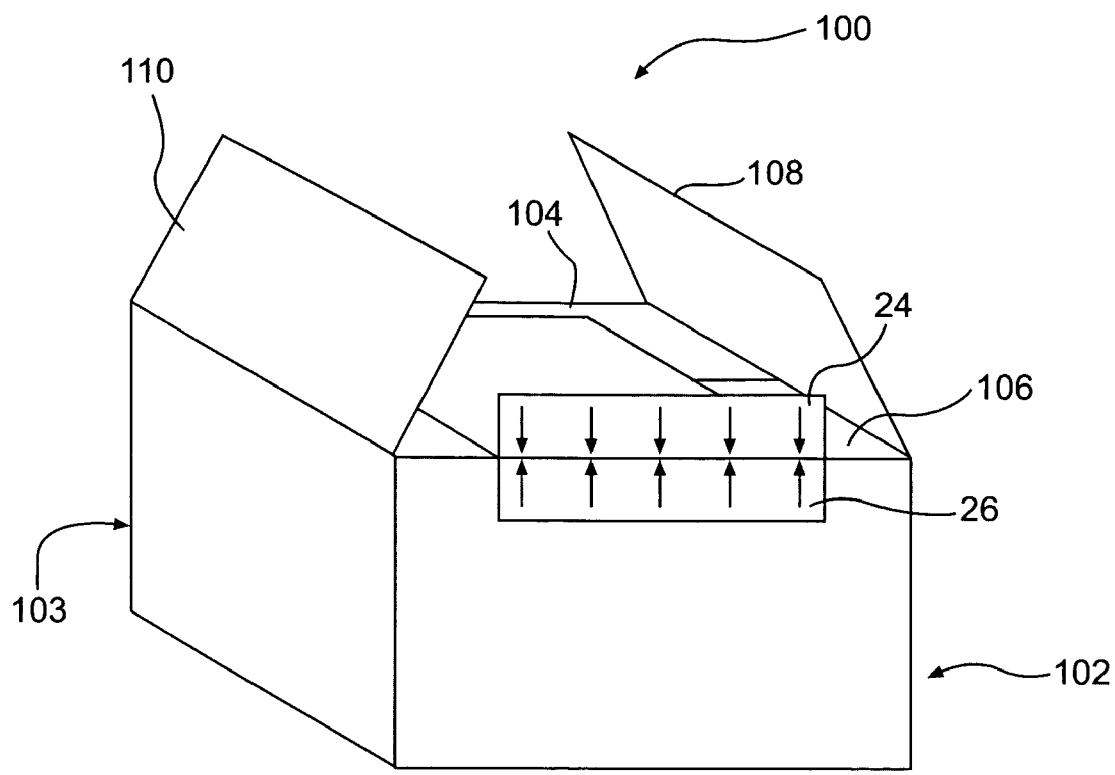
Figure 5C:
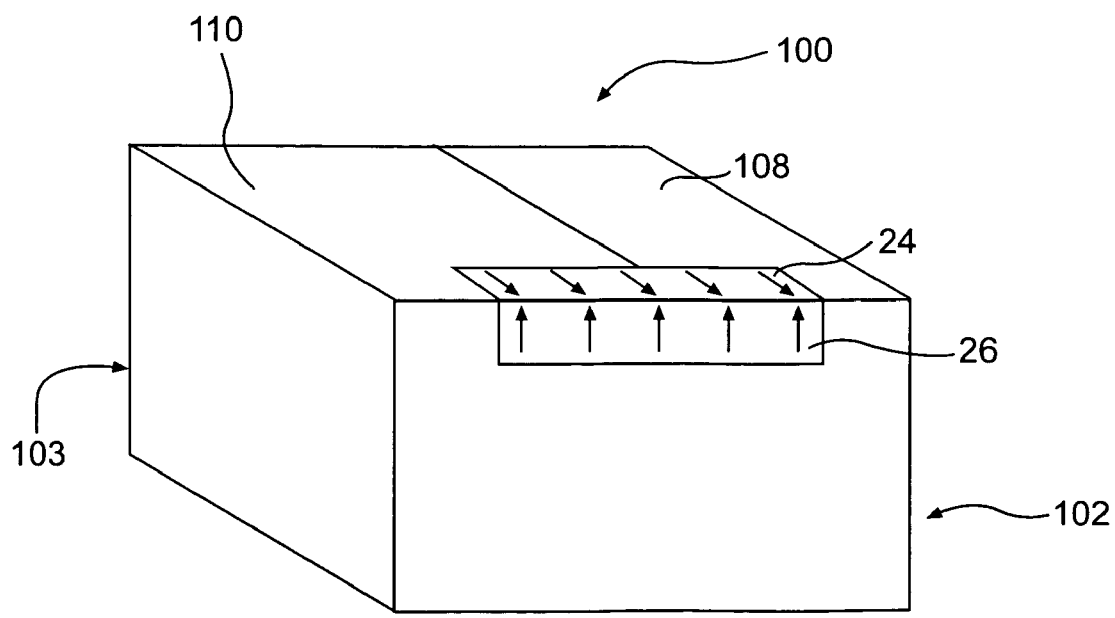

The envelope 10 can be used as part of a system for shipping articles 100, as shown in FIGS. 5A–5C. The system 100 includes a container 102 to be sealed and an envelope 10. In the exemplary embodiment shown, the container is a box having a main body 103, two end flap portions 104, 106, and two side flap portions, such as sections or cover portions 108, 110. Other packaging arrangements may work equally well, such as, for example, some containers may have a single cover portion, which may be, for example, a flap or a removable lid.

Once the articles to be shipped are placed inside the container 102, the end flap portions 104, 106 are folded over into place. Next, the envelope 10, with or without the corresponding documents, is placed on top of at least one of the end flap portions 104, 106 such that the first and second flap portions 24, 26 extend beyond the container 102 as shown in FIG. 5B.

As shown in FIG. 5C, the cover portions 108, 110 are folded over into place in a manner such that the cover portions 108, 110 overlap the end flap portions 104, 106, and such that the cover portions 108, 110 cover the envelope 10 and hold it in place between the cover portions 108, 110 and the end flap portions 104, 106. Thus, the envelope 10 is disposed inside the container (i.e., not on the exterior surface) and adjacent to the cover portion. As shown in FIGS. 5B and 5C, the envelope 10 is placed in the center of the container 102, but it is understood that the envelope 10 could be placed off-center or beneath one of the cover portions 108, 110 without departing from the scope of the invention.

In addition, it is understood that if a container has only a single cover portion, the envelope could still be held between the cover portion and the end flap portions. It is also understood that the container could be formed without end flap portions and that the envelope could be held between an edge of the container and a cover portion or a removable lid.

Finally, the first and second flap portions 24, 26 are folded over so that the adhesive layers 42, 44 on the exterior surfaces 38, 40 of the flap portions 24, 26 are pressed into contact with an exterior surface of the container 102. Tape or other sealing means (not shown) may be applied to seal the edges of the cover flap portions 108, 110 and the open end 32. Alternatively, depending on the size of the container and/or the strength of the adhesive, the flap portions 20, 22 may be sufficient to seal the container 102. In this manner, the body portion 28 of the envelope containing the appropriate documents can be protected from contact with other containers that may be shipped.

In order to access the documents within the envelope 10, the receiver or Customs personnel can remove the portion of tape or other sealing means, if any, that seals the opening 32 and pull out the contents without opening the sealed container 102. If provided, the indicator marks 46, 48 can assist in locating the open end 32 of the envelope 10 for quick and easy inspection. In this manner, the articles remain sealed in the container 102, but the documents remain accessible.

Alternatively, where the adhesive layers 42, 44 do not extend to the open end 32 of the envelope, the receiver or Customs personnel can cut or otherwise separate along or near one of the fold lines 23, 25 to separate one of the flap portions 24 or 26 from the body portion 28 of the envelope 10. Then the body portion 28 can be pulled from between the cover flap portions 108, 110 and end flap portions 104, 106 outside the container 102 to allow access to the documents.

After the documents have been reviewed, the container 102 can be resealed (with or without the documents) and processed as necessary.

Other embodiments of the invention will be apparent to those skilled in the art from consideration of the specification and practice of the invention disclosed herein. For example, it is possible to use an envelope with a single flap that adheres to the exterior of the container while the body portion of the envelope is protected by the cover portion(s) of the container. In addition, although the envelope has been described as being formed from a specific sheet, it is understood that many other sheet and envelope configurations can be formed without departing from the scope of the invention.

It is intended that the specification and illustrated examples are exemplary only, the true scope and spirit of the invention being apparent from the following claims.

What is claimed is:

1. A system for associating documents with articles in a shipping container, the system comprising:
   an envelope having a generally flat body portion with an open end, first and second overlying flap portions extending from the open end and having oppositely facing exterior surfaces;
   a shipping container having a main body and at least one cover portion that cooperates with the main body to enclose the articles,
   wherein the envelope is placed between the at least one cover portion and the main body of the shipping container such that the body portion of the envelope is placed completely beneath the at least one cover portion and at least one of the first and second flap portions is affixed to the main body of the container.

2. The system according to claim 1, wherein each of the flap portions has an adhesive layer and the at least one of the first and second flap portions is folded towards the exterior of the container such that the adhesive layer contacts an exterior surface of the main body of the container.

3. The system according to claim 2, wherein the at least one cover portion includes an exterior surface.

4. The system according to claim 3, wherein the other of the first and second flap portions is affixed to the exterior surface of the at least one cover portion.

5. The system according to claim 4, wherein the container further includes a first end flap portion and a second end flap portion; and
   wherein the body portion of the envelope is located between the at least one cover portion and at least one of the first and second end flap portions.

6. The system according to claim 5, wherein the at least one cover portion includes a first cover portion and a second cover portion, each cover portion includes an exterior surface; and
   wherein the one of the first and second flap portions is affixed to the exterior surfaces of the first and second cover portions.

7. The system according to claim 1, wherein the container further includes a first end flap portion and a second end flap portion; and
   wherein the body portion of the envelope is located between the at least one cover portion and at least one of the first and second end flap portions.

8. The system according to claim 1, wherein the container is a box.

9. The system according to claim 1, wherein the first and second flap portions include interior surfaces having indicator marks thereon.

10. The system according to claim 9, wherein the indicator marks point toward the open end of the envelope.

11. A system for associating documents with articles in a shipping container, comprising:
    an envelope having a generally flat body portion with an open end, at least one flap portion extending from the open end and having an exterior surface continuous with an exterior surface of the body portion;
    a shipping container having a main body and at least one cover portion that cooperates with the main body to enclose the articles,
    wherein the envelope is placed between the at least one cover portion and the main body of the shipping container such that the body portion of the envelope is placed completely beneath the at least one cover portion and the at least one flap portion is affixed to the main body of the container.

12. The system according to claim 11, wherein the body portion includes a front panel and a rear panel having exterior surfaces; and
    wherein the at least one flap portion extends from one of the front and rear panels.

13. The system according to claim 12, wherein the at least one flap portion includes an interior surface having indicator marks thereon.

14. The system according to claim 13, wherein the at least one flap portion comprises first and second flap portions formed opposite each other at the open end, the first flap portion extending from the one of the front and rear panels, and the second flap portion extending from the other of the front and rear panels.

15. The system according to claim 11, wherein the envelope further comprises a second flap portion that is affixed to the at least one cover portion of the container.

16. A method for associating shipping documents with a shipping container having a main body with an exterior surface and at least one cover portion that cooperates with the main body to enclose a shipped article, the method comprising:
    providing an envelope having a generally flat body portion with an open end for enclosing the shipping documents within the body portion, the envelope also including at least one flap portion extending from the open end:
    placing the body portion of the envelope completely beneath the at least one cover portion with the open end of the envelope accessible at a side of the cover portion; and
    affixing the at least one flap portion of the envelope to the exterior surface of the main body of the shipping container to secure the envelope against removal from the container.

17. The method according to claim 16, wherein the flap portion includes an adhesive layer on an exterior surface and affixing the flap portion includes folding the flap portion towards the exterior of the container and bringing the adhesive layer of the flap portion into contact with the exterior surface of the main body.

18. The method according to claim 17, wherein the at least one cover portion includes an exterior surface and wherein the envelope further includes a second flap portion extending from the open end.

19. The method according to claim 18, further including the step of affixing the second flap portion to the exterior surface of the at least one cover portion.

20. The method according to claim 16, wherein the container further includes a first end flap portion and a second end flap portion, and wherein placing the envelope beneath the at least one cover portion includes placing the envelope between the at least one cover portion and at least one of the first and second end flap portions.

21. A method according to claim 16, further comprising placing at least one document associated with an article into the envelope.

22. A method according to claim 21, wherein placing at least one document into the envelope occurs after placing the envelope beneath the at least one cover portion.

23. A package, comprising:
a container having a main body and a cover portion, the cover portion being configured to at least partially close an opening in the container; and
an envelope comprising
a body portion configured to receive an article through an open end, the body portion being substantially contained within the container and completely beneath the cover portion, and
a flap portion extending from the body portion, the flap portion being attached to the the main body of the container.

24. The package according to claim 23, wherein the flap portion comprises an adhesive layer and wherein the flap portion of the envelope is folded towards the exterior of the container such that the adhesive layer contacts the main body of the container.

25. The package according to claim 23, wherein the envelope comprises a second flap portion extending from the body portion,
wherein the second flap portion is affixed to the cover portion.

26. The package according to claim 23, wherein the flap portion includes an interior surface having indicator marks thereon.

27. The package according to claim 23, comprising documents relating to contents of the container disposed within the body portion of the envelope.

* * * * *